J. STEVENS.
Improvement in Stop-Cocks.

No. 130,876.

Patented Aug. 27, 1872.

UNITED STATES PATENT OFFICE.

JOHN STEVENS, OF NEW YORK, N. Y., ASSIGNOR TO JOSEPH H. DEVLIN, OF SAME PLACE.

IMPROVEMENT IN STOP-COCKS.

Specification forming part of Letters Patent No. 130,876, dated August 27, 1872.

Specification describing a new and Improved Valve or Stop-Cock, invented by JOHN STEVENS, of the city, county, and State of New York.

Figure 1:
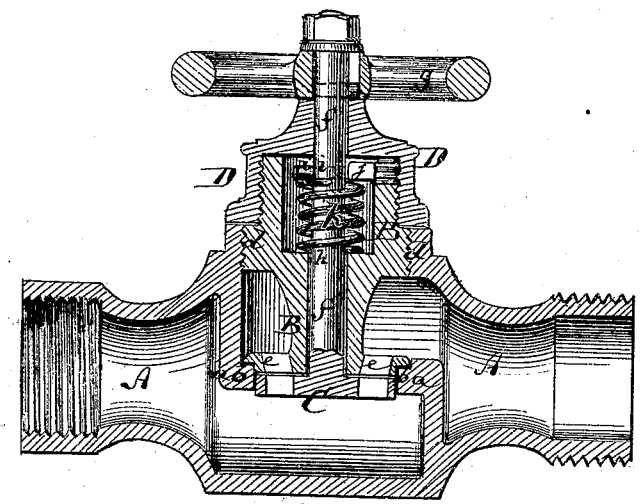
Figure 2:
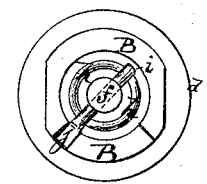
Figure 3:
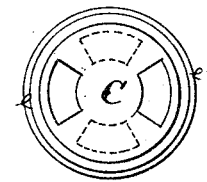

Figure 1 is a vertical longitudinal section of my improved valve or stop-cock. Fig. 2 is a top view of the same after the hand-wheel and cap have been removed. Fig. 3 is a bottom view of the valve.

Similar letters of reference indicate corresponding parts.

This invention relates to a new construction of valve or stop-cock for gas, steam-pipe, &c., with the object of insuring a good fit, even wear, and satisfactory operation by simple and economical means. The invention consists chiefly in making the valve proper of a perforated disk, which is drawn against the lower side of a perforated plate and turns thereon to open or close the apertures. With this feature is connected a new manner of arranging the upper part of the valve mechanism for giving the valve the requisite quarter turns and holding it tight against its seat.

A in the drawing is the section of pipe in which the perforated partition $a$, forming the valve-seat $b$, is arranged, as usual. B is a tube screwed into the upper opening of the pipe A, as at $d$, and provided at its lower end with a flange or enlargement, $e$, which rests firmly on the valve-seat $b$, being, by preference, recessed to fit the same, as shown. The flange or plate $e$ is perforated at certain intervals. C is the valve, in form of a circular plate, which is held against the under side of the plate $e$. The central stem $f$ of the valve projects upward through the tube B, and through a cap, D, which is placed over the tube. A hand-wheel, $g$, or handle is applied to the upper end of the stem $f$. A spring, $h$, embraces the stem $f$ within a chamber in the tube B, and bears from below against a shoulder or pin, $i$, of said stem with the object of drawing the valve C tight against the plate $e$. The valve C is perforated in conformity to the holes in the plate $e$ so that it may be turned to open or entirely close said holes. The degree of motion allowed to the valve in either direction is regulated by a pin, $j$, which may be a continuation of the pin $i$, and projects from the stem $f$ into a recess or notch of the tube B, or by equivalent means. When the valve is opened, as in Fig. 1, its apertures are in line with those in $e$. The spring always holds the valve tight against the plate $e$, wear is evenly distributed over the entire surface of the valve, and the same will, therefore, always remain in condition for proper operation.

Dirt cannot accumulate on the valve as it can under the ordinary valves between the same and their seats. The upper end of the tube B is or may be flattened, as in Fig. 2, or otherwise prepared to receive a wrench, whereby it can be screwed down or unscrewed.

Having thus described my invention, I claim as new and desire to secure by Letters Patent—

A pipe-section, A, having perforated partition $a$ and a valve-seat, $b$, combined with tube B having perforated flange $e$, the valve C having stem $f$ $i$, and the spring $h$, all arranged as and for the purpose described.

JOHN STEVENS.

Witnesses:
A. V. BRIESEN,
T. B. MOSHER.